United States Patent [19]

Enomoto et al.

[11] Patent Number: 5,091,344
[45] Date of Patent: Feb. 25, 1992

[54] FIBER REINFORCED CERAMICS OF CALCIUM PHOSPHATE SERIES COMPOUNDS AND METHOD OF PRODUCING THE SAME

[75] Inventors: Ryo Enomoto; Yoshimi Matsuno; Masato Yokoi, all of Ogaki, Japan

[73] Assignee: Ibiden Corporation, Gifu, Japan

[21] Appl. No.: 415,310

[22] PCT Filed: Jan. 30, 1989

[86] PCT No.: PCT/JP89/00092

§ 371 Date: Sep. 27, 1989

§ 102(e) Date: Sep. 27, 1989

[30] Foreign Application Priority Data

Jan. 30, 1988 [JP] Japan .................. 63-18567
Apr. 27, 1988 [JP] Japan ................. 63-102655

[51] Int. Cl.$^5$ ............................. C04B 35/00
[52] U.S. Cl. .......................... 501/1; 501/95; 501/32; 501/123; 106/35; 264/60; 264/62; 423/308; 423/311
[58] Field of Search .............. 423/308, 311; 501/95, 501/101, 135, 142, 326, 123; 106/35; 433/202.1; 264/60, 82, 62

[56] References Cited

U.S. PATENT DOCUMENTS

| | | | |
|---|---|---|---|
| 4,215,033 | 7/1980 | Bowen | 106/35 |
| 4,230,455 | 10/1980 | Hidaka et al. | 433/202.1 |
| 4,503,157 | 3/1985 | Hatahira | 423/308 |

FOREIGN PATENT DOCUMENTS

| | | | |
|---|---|---|---|
| 0145210 | 6/1985 | European Pat. Off. | 106/35 |
| 52-81309 | 7/1977 | Japan . | |
| 52-149895 | 12/1977 | Japan . | |
| 58-91061 | 5/1983 | Japan . | |
| 59-219 | 1/1984 | Japan . | |
| 59-57971 | 4/1984 | Japan . | |
| 60-54906 | 12/1985 | Japan . | |
| 61-41876 | 9/1986 | Japan . | |
| 61-291460 | 12/1986 | Japan . | |
| 62-12671 | 1/1987 | Japan . | |
| 62-187142 | 8/1987 | Japan . | |
| 62-230680 | 10/1987 | Japan . | |
| 62-260778 | 11/1987 | Japan . | |

*Primary Examiner*—William R. Dixon, Jr.
*Assistant Examiner*—Paul Marcentoni
*Attorney, Agent, or Firm*—Sandler, Greenblum, & Bernstein

[57] ABSTRACT

It relates to calcium phosphate series compound ceramics in which heat-resistant inorganic short fibers such as flawless SiC or $Si_3N_4$ are three-dimensionally dispersed in a matrix composed of calcium phosphate series compound and entangled with each other to form a high strength shaped body as well as a method of producing the same. And also, it relates to a high density silicon carbide ceramic in which biological glass is impregnated and filled in a porous shaped body, which provides composite ceramics having high strength and high toughness and suitable as a heat-resistant structural material or a material for bio hard texture.

15 Claims, No Drawings

FIBER REINFORCED CERAMICS OF CALCIUM PHOSPHATE SERIES COMPOUNDS AND METHOD OF PRODUCING THE SAME

TECHNICAL FIELD

This invention relates to fiber reinforced ceramics of calcium phosphate series compounds, and proposes fiber reinforced ceramics of calcium phosphate series compounds in which flawless heat-resistant inorganic short fibers are three-dimensionally and uniformly dispersed in a matrix composed of calcium phosphate series compound and entangled with each other to form a high strength shaped body and hence provide both high strength and high rupture toughness values as well as a method of producing the same.

BACKGROUND ART

Recently, ceramics of calcium phosphate series compounds such as apatite hydroxide [$Ca_{10}(PO_4)_6(OH)_2$], tricalcium phosphate [$Ca_3(PO_4)_2$] and the like are expected as an implant material for artificial tooth root, artificial bone or the like because of excellent bioaffinity. However, these calcium phosphate compound ceramics cannot be said to have sufficient strength and toughness against mechanical impact or stress produced when being used as the artificial bone or tooth root, so that they are not yet put into practical use at present.

Under obtaining above circumstances, there has hitherto been made many studies and developments for the implant materials having excellent affinity to biotexture as well as excellent strength and toughness. Among them, composite ceramics obtained by adding heat-resistant inorganic short fibers to the calcium phosphate series compound ceramic are highlighted as effective.

For instance, there are proposed "Artificial tooth, artificial bone and method of producing the same" in Japanese Patent Application Publication No. 59-219, "Carbon fiber-apatite series composite fired bodies" in Japanese Patent Application Publication No. 61-41876, "Mineral fiber-apatite series composite fired bodies" in Japanese Patent laid open No. 59-57971 and the like as a related technique, and also there is a study by Iida, Iijima et al, "Fiber reinforced apatite through pressurized sintering so as to orient mild carbon fibers into long axis direction" in Association of Japan Ceramics, abstract collection for forum, forum item number 3G09.

In the case of the above conventional techniques, the toughness of apatite is somewhat improved, but there are not yet developed high density fiber reinforced apatites satisfying conditions required as an implant material for artificial bone, artificial tooth root or the like, i.e. having excellent strength and toughness.

That is, the high density fiber reinforced apatites produced by these known techniques have a drawback that a large shrinkage is caused during the sintering because a relatively low density green shaped body is forcedly densified by sintering under a pressure. In other words, the heat-resistant inorganic fibers such as whisker and the like contained in the green shaped body are subjected to a large deformation during the pressurized sintering or broken in extreme cases. Furthermore, the mixture of powder and fibers is merely fixed, so that the adhesion property between the fiber and the powder matrix is poor. Therefore, the toughness and also the strength are not so improved through the heat-resistant inorganic fibers are added.

Furthermore, in the above conventional techniques, the heat-resistant inorganic fibers are apt to be oriented in a two-dimensional direction, so that the anistropy is caused in the strength and toughness, and consequently there should be considered the anisotropy in use.

It is an object of the invention to propose fiber reinforced ceramics of calcium phosphate compounds capable of advantageously solving the above drawbacks of the conventional technique as well as a method of producing the same.

DISCLOSURE OF INVENTION

Now, the inventors have made various studies with respect to fiber reinforced calcium phosphate series compound ceramics capable of solving the aforementioned drawbacks of the conventional technique and having excellent strength and toughness, as well as their production method. Consequently, they have developed novel ceramics and their production method having the following features. That is, the fiber reinforced ceramic of calcium phosphate series compound according to a first aspect of the invention is a composite ceramic in which heat-resistant inorganic short fibers are three-dimensionally and uniformly dispersed in a matrix composed of calcium phosphate series compound, and this matrix is comprised of fine powder of calcium phosphate series compound and calcium phosphate series compound produced when a precursor of calcium phosphate series compound is subjected to a heat treatment.

Secondly, the fiber reinforced ceramic of calcium phosphate series compound according to the invention is a porous composite ceramic in which heat-resistant inorganic short fibers are three-dimensionally and uniformly dispersed in a matrix composed of calcium phosphate series compound, and this matrix is comprised of fine powder of calcium phosphate series compound and calcium phosphate series compound produced when a precursor of calcium phosphate series compound is subjected to a heat treatment and also biological glass is filled in pores of the ceramic.

Thirdly, the invention lies in a method of producing fiber reinforced ceramics of calcium phosphate series compounds in which heat-resistant inorganic short fibers are three-dimensionally and uniformly dispersed in a matrix composed of calcium phosphate series compound, which comprises:

(1) a step of wet mixing fine powder of calcium phosphate series compound with heat-resistant inorganic short fibers and shaping this mixture to form a green shaped body;

(2) a step of impregnating the green shaped body with a solution of a precursor of calcium phosphate series compound and drying to form a preliminary shaped body; and (3) a step of heat treating the preliminary shaped body obtained in the above step at a temperature of not lower than 600° C. to obtain a fiber reinforced ceramic.

Further, the invention proposes a method of producing calcium phosphate series compound ceramics by adding a step of filling biological glass in remaining pores of the shaped body at the heat treatment of the above step (3) or after such a heat treatment to more densify the shaped body and hence enhance strength and toughness.

The fiber reinforced ceramics of calcium phosphate series compounds according to the invention as mentioned above possess high strength and toughness and form a composite body suitable as an implant material for artificial tooth root, artificial bone or the like because the heat-resistant inorganic short fibers added to the matrix are substantially flawless and also these heat-resistant inorganic short fibers are three-dimensionally and uniformly dispersed in the matrix composed of calcium phosphate series compound and entangled with and strongly bonded to each other.

The construction of the invention will be described in detail below.

The first invention is a composite ceramic in which the heat-resistant inorganic short fibers are three-dimensionally and uniformly dispersed in the matrix composed of calcium phosphate series compound, and is characterized in that the matrix is comprised of fine powder of calcium phosphate series compound and calcium phosphate series compound ceramic produced when the solution of calcium phosphate series compound precursor is impregnated in the pores of the green shaped body, dried and subjected to a heat treatment.

In this way, the matrix is formed by both the fine powder and the product from the precursor to obtain a high density green shaped body. Therefore, even when the heat treatment is carried out under a pressure, the large shrinkage in the sintering is eliminated, and as a result, the deformation or breakage of the heat-resistant inorganic short fiber is reduced. Furthermore, the invention is convenient for obtaining the very excellent adhesion property between the inorganic short fiber and the matrix in addition to the high densification.

The fiber reinforced ceramics of calcium phosphate series compounds according to the invention are desirable to have a porosity of not more than 30%, particularly not more than 10%.

In the fiber reinforced ceramics of calcium phosphate series compound according to the invention, the strength and toughness are excellent, wherein the flexural strength measured according to JIS R-1601 is not less than 180 MPa and a value of rapture toughness measured by an indentation method and calculated according to Niihara's equation is not less than 2.3 $MPA \cdot m^{\frac{1}{2}}$.

Furthermore, the fiber reinforced ceramics of calcium phosphate series compounds according to the invention have no anisotropy in the strength and toughness because the heat-resistant inorganic short fibers are three-dimensionally and uniformly dispersed in the matrix composed of calcium phosphate series compound, so that there is no need of considering the anisotropy in use.

In the fiber reinforced ceramics of calcium phosphate series compounds according to the invention. the amount of heat-resistant inorganic short fiber contained in the matrix is preferable to be 1~45 vol %. Because, when the amount is less than 1 vol %, there is substantially no effect of improving the strength and toughness, while when it exceeds 45 volume %, the uniform dispersibility of the heat-resistant inorganic short fiber in the matrix of calcium phosphate series compound lowers to make the strength and toughness low. The preferable range is 5~25 vol %.

The heat-resistant inorganic short fiber is preferable to have an average length of not more than 10 mm and an average aspect of ratio of 10~10000, which is, for example, at least one fiber selected from whiskers or chopped fibers of Sic, $Si_3N_4$, $ZrO_2$, $Al_2O_3$, $SiO_2$, C, $2SiO_2 \cdot 3Al_2O_3$ and the like.

The second proposal of the invention is a fiber reinforced ceramic of calcium phosphate series compound obtained by filling biological glass having an excellent bioaffinity in pores of the porous shaped body composed of the aforementioned fiber reinforced calcium phosphate series compound ceramic to more enhance the densification (density).

In this ceramic, at least one glass selected from $CaO-Al_2O_3-P_2O_5$ series glass, $CaO-Al_2O_3-SiO_2-P_2O_5$ series glass, $Na_2O-CaO-SiO_2-P_2O_5$ series glass, $Na_2O-K_2O-MgO-CaO-SiO_2-P_2O_5$ series glass, $CaO-P_2O_5$ series glass and $MgO-CaO-SiO_2-P_2O_5$ series glass is used as the biological glass impregnated and filled in the pores.

Then, the method of producing the calcium phosphate series compound ceramics according to the invention will be described in detail.

The production method of the invention is fundamentally characterized by having the following three steps.

The step (1) is a step of wet mixing fine powder of calcium phosphate series compound with heat-resistant inorganic short fibers and shaping to form a green shaped body.

In the step (1), at least one selected from various apatites such as hydroxy apatite, carbonate apatite, fluorine apatite, chlorine apatite and the like; tricalcium phosphates and so on may be used as the fine powder of calcium phosphate series compound. Particularly, the use of hydroxy apatite having a good bioaffinity alone or the mixture consisting essentially of hydroxy apatite is preferable. The fine powder has an average grain size of not more than 3 μm, preferably not more than 1 μm. Moreover, a sintering aid may be added to the fine powder of calcium phosphate series compound.

The heat-resistant inorganic short fiber is preferably used to have an average length of not more than 10 mm and an average aspect ratio of 10~10000, and uses, for example, at least one fiber selected from whiskers or chopped fibers of SiC, $Si_3N_4$, $ZrO_2$, $Al_2O_3$, $SiO_2$, carbon silica alumina and the like having high strength and excellent heat resistance.

According to the invention, it is advantageous to use the heat-resistant inorganic short fibers previously subjected to a surface treatment for improving the adhesion property to calcium phosphate series compound produced from the solution of calcium phosphate series compound precursor. As such a surface treatment, it is effective to conduct, for example, a silane coupling treatment, a heat treatment in various gas atmospheres, a heat treatment after immersion in a solution of various metal alkoxides and the like to form a coating layer of carbon, carbide ceramic, silicide ceramic, boride ceramic or the like.

In the invention, the fine powder of calcium phosphate series compound is wet mixed with the heat-resistant inorganic short fibers for uniformly dispersing and mixing them. As a dispensing medium used in the wet mixing, mention may be made of water, various organic solvents and the like. As a method of preparing the slurry, it is preferable to prevent the damaging of fibers as far as possible. For example, a method of using high speed mixer, a ball mill, a ultrasonic dispersing machine or the like can be applied.

In the wet mixed mixture, it is favorable that the amount of fine powder of calcium phosphate series compound is 5~35% by weight and the amount of heat-resistant inorganic short fiber is 1~15% by weight.

In the wet mixing, a binder or dispersing agent as mentioned later may be added, if necessary, and further an agglomerating agent may be added after the uniform dispersion.

As the binder, there is used at least one binder selected from organic binders such as polyacrylate, polymethyl methacrylate, polyvinyl alcohol, polyvinyl butyral, polyethylene oxide, polymethacrylate, methyl cellulose, urethane and the like; and solutions of precursors for calcium phosphate series compound acting as a binder.

As the dispersing agent, there is used at least one selected from triolein, methyl oleate, natural fish oil, synthetic surfactant, benzene sulfonic acid, allylsulfonic acid, phosphate, polycarboxylic acid, ammonia and the like.

As the agglomerating agent, there is used at least one selected from polyacrylamide, polymethacrylate, aluminum sulfate, aluminum polychloride and the like.

As the method of shaping the mixture, there may be applied a dry shaping method in which the mixture is dried and pressed after the removal of the dispensing medium and a wet shaping method such as as-shaping of the mixture at wet state, cast shaping or the like. However, when the starting material is obtained by previously wet mixing the fine powder of calcium phosphate series compound with the heat-resistant inorganic short fibers and then drying them, it is not preferable to apply the dry shaping through pressing. Since such a starting material is at a state of secondary particle consisting of the mixture of calcium phosphate series compound fine powder and heat-resistant inorganic fiber, even when the starting material is shaped by pressing, gain boundary not continuously entangling the fibers with each other remains between the secondary particles in the shaped body. That is such a grain boundary renders into a source for generating the breakage, which is not related to the improvement of toughness and strength though the heat-resistant inorganic fiber is added.

On the contrary, the wet shaped is preferable because the heat-resistant inorganic short fibers are hardly damaged and these fibers are liable to be three-dimensionally and uniformly dispersed to form a shaped body at such a state that the fibers are continuously entangled with each other in the shaped body. Moreover, in order to further enhance the density of the shaped body, a pressing such as rubber pressing or the like may be carried out within a range of not damaging the heat-resistant inorganic short fibers.

The resulting shaped body may further be dried or heat treated in air or in a nitrogen ags or inert gas atmosphere. In this case, the drying or heat treatment is to merely hold the shaped body.

The thus obtained shaped body is preferable to contain 1~45 vol %, more particularly 3~25 vol % of the heat-resistant inorganic short fiber. The reason why the shaped body contains 1~45 vol% of the heat-resistant inorganic short fibers is due to the fact that the finally produced fiber reinforced calcium phosphate series compound ceramic has very excellent strength and toughness.

Then, the above step (2) is a stage that a preliminary shaped body is prepared by impregnating a solution of calcium phosphate series compound precursor in the green shaped body and then drying it.

The reason why the green shaped body is impregnated with the solution of calcium phosphate series compound precursor and then dried is due to the fact that the calcium phosphate series compound precursor is filled in the pores of the shaped body by drying to prevent the deformation of breakage of the heat-resistant inorganic short fibers in the shaped body. And also, the shaped body can be highly densified before the firing. Further, the adhesion property to the matrix is excellent, so that fiber reinforced calcium phosphate series compound ceramics having very excellent strength and toughness can be obtained. Moreover, when the subsequent heat treatment is carried out under a pressure, the shrinkage in the heat treatment is lessened, and the deformation or breakage of the heat-resistant inorganic short fiber can be suppressed as far as possible.

The solution of calcium phosphate series compound precursor is a solution of producing calcium phosphate series compound through the drying or heat treatment, and uses a mixed solution consisting of at least one solution selected from at least one aqueous or organic solvent solution of $Ca(PH_2O_2)$, $CaHPO_3 \cdot H_2O$, $CaHPO_4 \cdot 2H_2O$, and $Ca(H_2PO_4)_2 \cdot H_2O$ or an aqueous or organic solvent solution of $CaCl_2$, $Ca(NO_3)_2 \cdot 4H_2O$, $Ca(CHCOO)_2$ and various calcium alkoxides, and at least one solution selected from aqueous or organic solvent solutions of $H_3PO_4$, $P_2O_5$ and various alkoxides of phosphorus.

Moreover, it is favorable that the precursor solution for calcium phosphate series compound ceramics used in the invention is stable at room temperature over a long period of time (no quality change) and the concentration can easily be changed with water and the calcium phosphate series compound ceramic is produced from a relatively low temperature region near to 500° C. Particularly, a solution of adding 12~24 parts by weight of phosphoric anhydride to 100 parts by weight of calcium nitrate (tetrahydrate), or a solution of adding 12~24 parts by weight of phosphoric anhydride and not more than 5400 parts by weight of water to 100 parts by weight of calcium nitrate is preferable.

The solution of the precursor of calcium phosphate series compound can be produced by heating 100 parts by weight of calcium nitrate (tetrahydrate) containing crystal water to form a melt salt $Ca(NO_3)_2$, adding and well mixing about 70 parts by weight of the melt salt with 12~24 parts by weight, preferably 17~20 parts by weight of phosphoric anhydride $P_2O_5$ to form a homogeneous solution and further adding not more than 5400 parts by weight, preferably not more than 100 parts by weight of water, if necessary.

The reason why the amount of phosphoric anhydride added is limited to 12~24 parts by weight per 100 parts by weight of calcium nitrate (tetrahydrate) is due to the fact that when the amount is outside the above range, the ratio of calcium phosphate series compound produced lowers, which badly affects the strength, rupture toughness value and biological affinity. Particularly, when the amount of phosphoric anhydride added is 17~20 parts by weight and the amount of water is not more than 100 parts by weight, the precursor solution of calcium phosphate series compound having a considerably high synthesis ratio of hydroxyapatite with an excellent biological affinity can be obtained.

The precursor solution of calcium phosphate series compound is preferable to contain 10~60% by weight of calcium phosphate series compound as a conversion of ceramics produced by drying and firing and to have a viscosity of 10~5000 cp.

According to the invention, it is advantageous that the porosity of the shaped body is rendered into not more than 40%, preferably not more than 25% by repeating the treatment of impregnating the green shaped body with the precursor solution of calcium phosphate series compound and then drying at least one times. Because, when the porosity is more than 40%, it is difficult to obtain a high density by the subsequent heat treatment, and also when the heat treatment is carried out under a pressure, the shrinkage becomes large and the heat-resistant inorganic short fibers added are apt to be damaged and it is difficult to produce the fiber reinforced ceramics of calcium phosphate series compound having high strength and very excellent toughness.

In the step (2), a calcining may further be carried out in addition to the treatment of impregnating the green shaped body with the precursor solution of calcium phosphate series compound and drying them, or the treatment of such impregnation, drying and calcining may be repeated.

Next, the step (3) is a step of heat treating the preliminary shaped body obtained in the above step (2) at a temperature of not lower than 600° C. By such a heat treatment, the fine powder of calcium phosphate series compound, the heat-resistant inorganic short fibers and the calcium phosphate series compound produced from the precursor solution of calcium phosphate series compound are strongly bonded with each other to form a fiber reinforced ceramic.

The reason why the heat treatment is carried out at a temperature of not lower than at least 600° C. is due to the fact that the precursor solution of calcium phosphate series compound can be rendered into a ceramic and further the fine powder of calcium phosphate series compound, the heat-resistant inorganic short fibers and the calcium phosphate series compound ceramic produced from the precursor solution can be strongly adhered and bonded with each other. Furthermore, the remaining pores can be reduced by shrinking through the firing. Consequently, it is effective to obtain fiber reinforced calcium phosphate series compound ceramics having very excellent strength and toughness.

The heat treatment may be carried out under an atmospheric pressure or under a pressure. However, when it is required to obtain fiber reinforced calcium phosphate series compound ceramics having high density and very excellent strength and toughness by reducing the remaining pores at a low temperature in a short time to restrain the growth of crystal, it is advantageous to conduct the heat treatment under a pressure. As the pressurization method, it is desirable to adapt uniaxial pressurization, hydrostatic pressurization and the like. As the atmosphere in the heat treatment, use may be made of air, steam, nitrogen gas, inert gas and the like.

According to the invention, the above steps (2) and (3) may be carried out repeatedly.

The reason why the fiber reinforced calcium phosphate series compound ceramics having very excellent strength and toughness are obtained according to the invention as mentioned above is considered as follows. Firstly, the shaping is carried out after the wet mixing of the fine powder of calcium phosphate series compound and the heat-resistant inorganic short fibers. That is, such a wet mixing can produce the green shaped body having a structure that the heat-resistant inorganic short fibers are three-dimensionally and very uniformly dispersed without orienting in a particular direction. Secondly, the green shaped body is impregnated with the precursor solution of calcium phosphate series compound, dried or further subjected to a subsequent calcining treatment. That is, by such a treatment the filling of calcium phosphate series compound in the pores of the green shaped body can be accelerated to increase the density. Moreover, when the method of firing under a pressure is further adopted, the production can be achieved at a low temperature in a short time and also high density fiber reinforced calcium phosphate series compound ceramics having a small crystal grain size can advantageously be produced without damaging the heat-resistant inorganic short fibers during the production.

The second method proposed by the invention is characterized by conducting as a step (4) a treatment that biological glass is filled in the remaining pores of the shaped body in the heat treatment of the above step (3) or after the heat treatment. As a result, there can be produced fiber reinforced calcium phosphate series compound ceramics in which the biological glass is filled in the pores of the shaped body comprised of calcium phosphate series compound and heat-resistant inorganic short fibers.

According to the invention, the treatment of filling the biological glass is carried out by pumping a melt of biological glass into the pores of the shaped body or by a vacuum impregnation of placing the shaped body in a melt of biological glass under a vacuum. In brief, the calcium phosphate series compound ceramic can easily be further densified by such a treatment. Furthermore, powder of calcium phosphate series compound, heat-resistant inorganic short fibers and calcium phosphate series compound ceramic produced in the heat treatment of the precurcor solution of calcium phosphate series compound are strongly adhered and bonded to each other by this treatment. Moreover, the obtained composite ceramic is particularly a fiber reinforced calcium phosphate series compound ceramic having a very excellent toughness.

As the biological glass usable in this treatment, there may be used at least one glass selected from $CaO$—$Al_2O_3$—$P_2O_5$ series glass, $CaO$—$Al_2O_3$—$SiO_2$—$P_2O_5$ series glass, $Na_2O$—$CaO$—$SiO_2$—$P_2O_5$ series glass, $Na_2O$—$K_2O$—$MgO$—$CaO$—$SiO_2$—$P_2O_5$ series glass, and $CaO$—$P_2O_5$ series or $MgO$—$CaO$—$SiO_2$—$P_2O_5$ series glass.

Moreover, in the treatment at this stage, the heating may be further carried out after the filling to crystallize the above glass, whereby the bioaffinity can further be improved.

EXAMPLES

EXAMPLE 1

(1) In a ball mill were mixed 100 parts by weight of hydroxy apatite fine powder having an average particle size of 0.5 $\mu$m, 17 parts by weight of SiC whisker having an average length of 46 $\mu$m and an average aspect ratio of 153, 1 part by weight of polyethylene glycol and 500 parts by weight of water to prepare a slurry.

Then, this slurry was poured into a mold put with a screen having an opening of 0.04 mm, as-shaped by suction filtration, dried, subjected to a rubber pressing under a surface pressure of 3 t/cm$^2$, and calcined at a temperature of 900° C. in a steam for 2 hours to obtain a green shaped body. The thus obtained green shaped body has a bulk density of 1.74 g/cm$^3$, and the amount of SiC whisker contained in the green shaped body was 14.5% by volume.

(2) On the other hand, 100 parts by weight of calcium nitrate was melted by heating at 45° C., to which was added 18 parts by weight of phosphoric anhydride with stirring to obtain a homogeneous solution completely melting the phosphoric anhydride. Further, 44 parts by weight of water was added to this solution, whereby a ceramic precursor solution containing 25% by weight of hydroxy apatite (conversion as hydroxy apatite) was prepared.

The viscosity of the ceramic presursor solution was about 170 cp as measured by a B-type viscometer.

(3) The green shaped body obtained in the above (1) was impregnated with the ceramic precursor solution prepared in the above (2), and dried to obtain a preliminary shaped body. Thereafter, the preliminary shaped body was heat treated at a temperature of 700° C. in air for 2 hours to obtain a shaped body.

(4) The impregnation into the green shaped body and subsequent drying and heat treatment were repeated 10 times to fill hydroxy apatite to thereby provide a shaped body having a porosity of 15.8%. Thereafter, the shaped body was heat treated at a temperature of 1050° C. in an argon gas atmosphere for 12 hours to obtain a fiber reinforced ceramic.

The thus obtained fiber reinforced ceramic had a porosity of 4.3%, a flexural strength of 388 MPa as measured according to JIS R-1601 and a rupture toughness value of 3.8 MPa·m$^{\frac{1}{2}}$ as measured by an indentation method and calculated from a Niihara's equation, and was confirmed to be a fiber reinforced ceramic having high strength and toughness required as a material for bio hard texture such as artificial bone, artificial tooth root or the like.

EXAMPLE 2

In this example, the same procedure as in Example 1 was repeated, except that the pressurizing treatment with a rubber press at the step (1) of Example 1 was omitted, to produce a fiber reinforced ceramic.

The obtained fiber reinforced ceramic had a porosity of 7.2% and a flexural strength and a rapture toughness value of 317 MPa and 4.7 MPa·m$^{\frac{1}{2}}$ measured by the same methods as in Example 1, and was confirmed to be a fiber reinforced ceramic having high strength and toughness required as a material for bio hard texture such as artificial bone, artificial tooth root or the like.

EXAMPLE 3

In this example, the same procedure as in Example 1 was repeated, except that the impregnation into the green shaped body and subsequent drying and heat treatment at the step (1) were repeated 5 times to prepare a shaped body having a porosity of 22.7% and the shaped body was heat treated at a temperature of 1000° C. in an argon gas atmosphere under a pressure for 1 hour, to obtain a fiber reinforced ceramic.

The obtained fiber reinforced ceramic had a porosity of 0.2% and a flexural strength and a rupture toughness value of 416 MPa and 3.6 MPa·m$^{\frac{1}{2}}$ measured by the same methods as in Example 1, and was confirmed to be a fiber reinforced ceramic having high strength and toughness required as a material for bio hard texture such as artificial bone, artificial tooth root or the like.

EXAMPLE 4

In this example, a fiber reinforced ceramic was produced under the same conditions as in Example 3 except that 32 parts by weight of a polyacrylamide agglomerating agent (solid content 0.04% by weight) was further added and mixed with the mixed slurry prepared in the step (1) of Example 1.

The obtained fiber reinforced ceramic had a porosity of 0.3% and a flexural strength and a rupture toughness value of 390 MPa and 3.7 MPa·m$^{\frac{1}{2}}$ measured by the same methods as in Example 1, and was confirmed to be a fiber reinforced ceramic having high strength and toughness required as a material for bio hard texture such as artificial bone, artificial tooth root or the like.

EXAMPLE 5

In this example, the mixed slurry prepared in the step (1) of Example 1 was dried to form a granular mixed body. Then, this mixed body was pressed in a mold, rubber pressed under a surface pressure of 3 t/cm$^2$ and heat treated at a temperature of 700° C. in air for 2 hours to form a shaped body.

Then, a fiber reinforced ceramic was produced under the same conditions as in Example 1.

The obtained fiber reinforced ceramic had a porosity of 4.1% and a flexural strength and a rupture toughness value of 251 MPa and 3.3 MPa·m$^{\frac{1}{2}}$ measured by the same methods as in Example 1, and was confirmed to be a fiber reinforced ceramic having high strength and toughness required as a material for bio hard texture such as artificial bone, artificial tooth root or the like.

EXAMPLE 6

In this example, a fiber reinforced ceramic was produced under the same conditions as mentioned above except that the shaped body of Example 5 was heat treated at a temperature of 1000° C. in an argon gas atmosphere under a pressure for 1 hour.

The obtained fiber reinforced ceramic had a porosity of 0.5% and a flexural strength and a rupture toughness value of 260 MPa and 3.1 MPa·m$^{\frac{1}{2}}$ measured by the same methods as in Example 1, and was confirmed to be a fiber reinforced ceramic having high strength and toughness required as a material for bio hard texture such as artificial bone, artificial tooth root or the like.

EXAMPLE 7

In this example, a fiber reinforced ceramic was produced under the same conditions as in Example 5 except that the mixed slurry of Example 5 was added and mixed with 32 parts by weight of a polyacrylamide series agglomerating agent (solid content 0.04% by weight).

The obtained fiber reinforced ceramic had a porosity of 5.2% and a flexural strength and a rupture toughness value of 236 MPa and 3.0 MPa·m$^{\frac{1}{2}}$ measured by the same methods as in Example 1, and was confirmed to be a fiber reinforced ceramic having high strength and toughness required as a material for bio hard texture such as artificial bone, artificial tooth root or the like.

EXAMPLE 8

(1) After the impregnation of the ceramic precursor solution and subsequent drying and heat treatment were repeated 8 times as in the step (4) of Example 1, the firing was carried out at a temperature of 1050° C. in an argon gas atmosphere for 12 hours to obtain a fiber reinforced ceramic having a porosity of 15.3%.

(2) On the other hand, calcium carbonate, phosphoric acid and calcium hydroxide were weighed to be CaO: 30.09 wt %, $P_2O_5$: 68.86 wt % and $Al_2O_3$: 1.05 wt % as a respective oxide conversion and mixed with each other. Then, this mixture was dried at 110° C. for 24 hours, calcined at 300° C. for 3 hours and melted in a platinum crucible at 1250° C. for 1 hour to prepare a melt of $CaO$—$Al_2O_3$—$P_2O_5$ series biological glass.

(3) The fiber reinforced ceramic obtained in the above (1) was placed in a mold heated at 1250° C., and the glass melt obtained in the above (2) was poured into the mold, and pressurized under a pressure of 1 t/cm² to fill the glass melt in the pores of the fiber reinforced ceramic, and then cooled to obtain a fiber reinforced ceramic. The thus obtained fiber reinforced ceramic has a porosity of 0.2% and a flexural strength and a rupture toughness value of 430 MPa and 3.5 MPa·m$^{\frac{1}{2}}$ measured by the same methods as in Example 1, and was confirmed to be a fiber reinforced ceramic having high strength and toughness required as an implantation material for artificial bone, artificial tooth root or the like.

INDUSTRIAL APPLICABILITY

As mentioned above, the fiber reinforced ceramics of calcium phosphate series compounds and the fiber reinforced calcium phosphate series compound ceramics obtained by the invention possess high strength and toughness because ① the composited heat-resistant inorganic short fibers are hardly deformed and broken, ② the heat-resistant inorganic short fibers are three-dimensionally and uniformly dispersed in the matrix of fiber reinforced calcium phosphate series compound and entangled with each other, ③ the adhesion property to the matrix is excellent. Therefore, they are suitable as an implantation material for artificial tooth root, artificial bone or the like, i.e. a material for bio hard texture.

We claim:

1. A method of producing fiber reinforced composite ceramics of calcium phosphate series compounds in which heat-resistant inorganic short fibers are three-dimensionally and uniformly dispersed in a matrix of calcium phosphate series compound, and said matrix is strongly adhered to said heat resistant inorganic short fibers, which comprises:
   (1) a step of wet mixing fine powder of calcium phosphate series compound with heat-resistant inorganic short fibers and shaping this mixture to form a green shaped body;
   (2) a step of impregnating the green shaped body with a solution of a precursor of calcium phosphate series compound and drying to form a preliminary shaped body; and
   (3) a step of heat treating the preliminary shaped body obtained in the above step at a temperature of not less than 600° C. to obtain a fiber reinforced ceramic.

2. The method according to claim 1, wherein at least a part of the impregnating drying and heat treatments in said steps (2) and (3) is repeated.

3. The method according to claim 1, wherein an amount of said heat-resistant inorganic short fiber contained in said matrix comprised of said calcium phosphate series compound is 1~45 vol %.

4. The method according to claim 1, wherein said fine powder of said calcium phosphate series compound is at least one compound selected from the group consisting of hydroxy apatite, carbonate apatite, fluorine apatite, chlorine apatite and tricalcium phosphate, wherein said compound has an average particle size of not more than 3 μm as a fine powder.

5. The method according to claim 1, wherein said heat-resistant inorganic short fiber is at least one chopped fiber selected from the group consisting of SiC, $Si_3N_4$, $ZrO_2$, $Al_2O_3$, C and $2SiO_2·3Al_2O_3$, wherein said short fiber has an average length of not more than 10 mm and an average aspect ratio of 10~10000.

6. The method according to claim 1, wherein said precursor of calcium phosphate series compound produces calcium phosphate series compound by drying and firing and is a solution comprising:
   a. at least one solvent selected from the group consisting of aqueous and organic solvents; and
   b. at least one precursor selected from (1) the group consisting of $Ca(PH_2O_2)$, $CaHPO_3·H_2O$, $CaHPO_4·2H_2O$ and $Ca(H_2PO_4)_2·H_2O$, or (2) a mixed solution of at least one solution selected from aqueous solutions or organic solvent solutions of $CaCl_2$, $Ca(NO_3)_2·4H_2O$, $Ca(CHCOO)_2$ and calcium alkoxides, and at least one solution selected from aqueous solutions or organic solutions of $H_3PO_4$, $P_2O_5$ and phosphorus alkoxides.

7. The method according to claim 1, wherein said precursor solution of calcium phosphate series compound is a solution of compounding 12~24 parts by weight of phosphoric anhydride with 100 parts by weight of calcium nitrate or an aqueous solution of adding 12~24 parts by weight of phosphoric anhydride and not more than 5400 parts by weight of water to 100 parts by weight of calcium nitrate.

8. A method of producing fiber reinforced composite ceramics of calcium phosphate series compounds in which heat-resistant inorganic short fibers are three-dimensionally and uniformly dispersed in a matrix composed of calcium phosphate series compound and biological glass is filled in remaining pores of a shaped body to form a high density composite ceramic, which comprises:
   (1) a step of wet mixing fine powder of calcium phosphate series compound with heat-resistant inorganic short fibers and shaping this mixture to form a green shaped body;
   (2) a step of impregnating the green shaped body with a solution of a precursor of calcium phosphate series compound and drying to form a preliminary shaped body;
   (3) a step of heat treating the preliminary shaped body obtained in the above step at a temperature of not lower than 600° C. to obtain a fiber reinforced ceramic; and
   (4) a step of filling a biological glass in pores of said shaped body at the heat treatment of said step (3) or after the heat treatment.

9. The method according to claim 8, wherein at least a part of the impregnating drying and heat treatments in said steps (2) and (3) is repeated.

10. The method according to claim 8, wherein an amount of said heat-resistant inorganic short fiber contained in said matrix comprised of said calcium phosphate series compound is 1~45 vol %.

11. The method according to claim 8, wherein said fine powder of said calcium phosphate series compound is at least one compound selected from the group consisting of hydroxy apatite, carbonate apatite, fluorine apatite, chlorine apatite and tricalcium phosphate, wherein said compound has an average particle size or not more than 3 μm as a fine powder.

12. The method according to claim 8, wherein said heat-resistant inorganic short fiber is at least one chopped fiber selected from the group consisting of SiC, $Si_3N_4$, $ZrO_2$, $Al_2O_3$, C and $2SiO_2.3Al_2O_3$, wherein said short fiber has an average length of not more than 10 mm and an average aspect ratio of 10~10000.

13. The method according to claim 8, wherein said precursor of calcium phosphate series compound produces calcium phosphate series compound by drying and firing and is a solution comprising:
  a. at least one solvent selected from the group consisting of aqueous and organic solvents; and
  b. at least one precursor selected from (1) the group consisting of $Ca(PH_2O_2)$, $CaHPO_3.H_2O$, $CaHPO_4.2H_2O$ and $Ca(H_2PO_4)_2.H_2O$, or (2) a mixed solution of at least one solution selected from aqueous solutions or organic solvent solutions of $CaCl_2$, $Ca(NO_3)_2.4H_2O$, $Ca(CHCOO)_2$ and calcium alkoxides, and at least one solution selected from aqueous solutions or organic solutions of $H_3PO_4$, $P_2O_5$ and phosphorus alkoxides.

14. The method according to claim 13, wherein said precursor solution of calcium phosphate series compound is a solution of compounding 12~24 parts by weight of phosphoric anhydride with 100 parts by weight of calcium nitrate or an aqueous solution of adding 12~24 parts by weight of phosphoric anhydride and not more than 5400 parts by weight of water to 100 parts by weight of calcium nitrate.

15. The method according to claim 8, wherein said biological glass is at least one glass selected from the group consisting of $CaO—Al_2O_3—P_2O_5$ series glass, $CaO—Al_2O_3—SiO_2—P_2O_5$ series glass, $Na_2O—K_2O—MgO—CaO—SiO_2—P_2O_5$ series glass, $CaO—P_2O_5$ series glass and $MgO—CaO—SiO_2—P_2O_5$ series glass.

* * * * *